W. B. PARRISH.
COMBINED PLANTER AND FERTILIZER DISTRIBUTER.
APPLICATION FILED AUG. 19, 1908.
922,028.
Patented May 18, 1909.
2 SHEETS—SHEET 1.
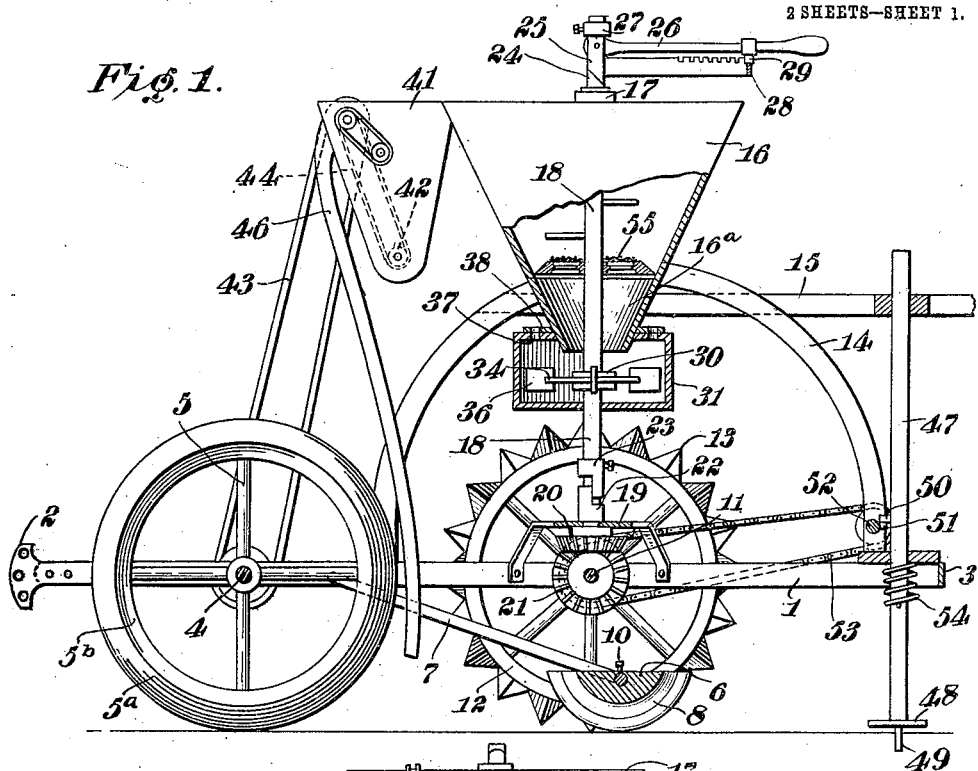
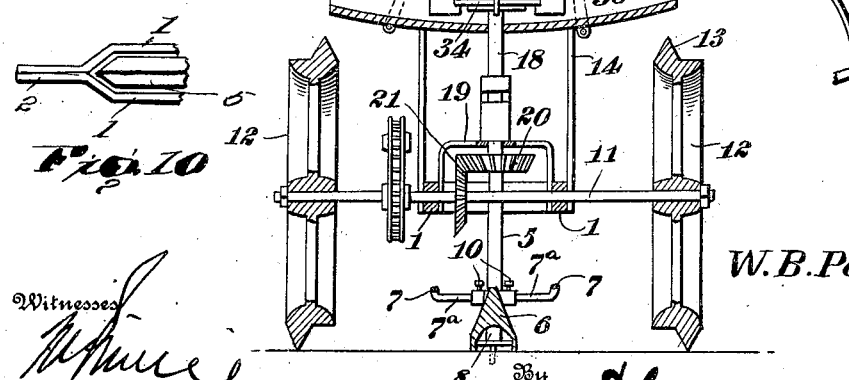
Inventor
W. B. Parrish, W. B. PARRISH.
COMBINED PLANTER AND FERTILIZER DISTRIBUTER.
APPLICATION FILED AUG. 19, 1908.
922,028.
Patented May 18, 1909.
2 SHEETS—SHEET 2.
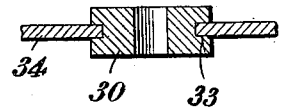
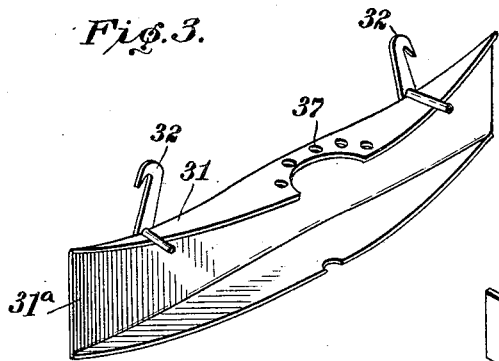
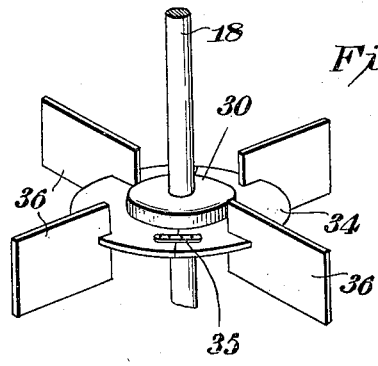
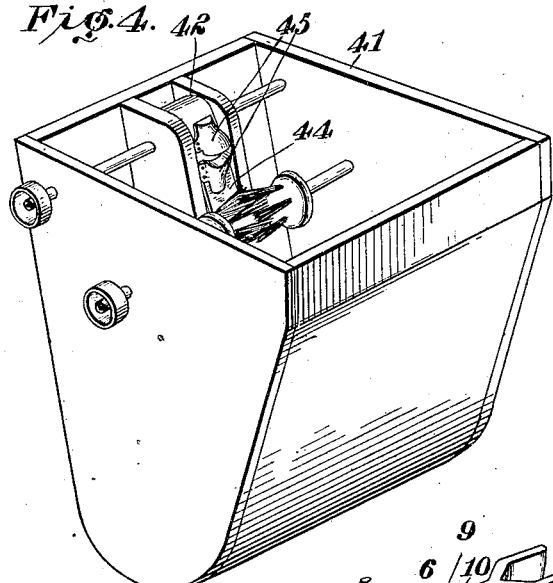
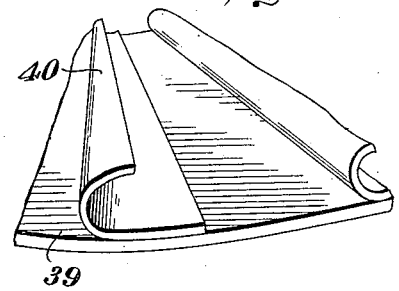
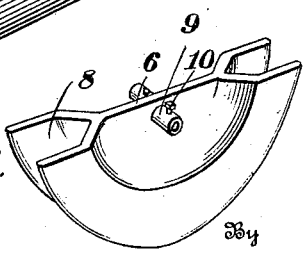
Inventor
W. B. Parrish,

UNITED STATES PATENT OFFICE.

WASHINGTON B. PARRISH, OF KARA, VIRGINIA.

COMBINED PLANTER AND FERTILIZER-DISTRIBUTER.

No. 922,028.  Specification of Letters Patent.  Patented May 18, 1909.

Application filed August 19, 1908. Serial No. 449,292.

*To all whom it may concern:*

Be it known that I, WASHINGTON B. PARRISH, a citizen of the United States, residing at Kara, in the county of Lunenburg and State of Virginia, have invented certain new and useful Improvements in Combined Planters and Fertilizer-Distributers, of which the following is a specification.

The present invention relates to improvements in agricultural implements and more particularly to a combined planter and fertilizer distributer.

One of the objects of the invention is the provision of a machine of this character in which the distributing mechanism has a novel formation and not only admits of the quantity of material discharged being regulated, but also enables the material to be either thrown broad cast or in restricted streams upon opposite sides of the machine.

The invention further contemplates an improved planter provided with novel means for opening the furrow and closing the same after the seeds have been deposited therein.

A still further object of the invention is the provision of an indicator attachment which can be applied to the machine in rear of the furrow closer and will operate to tamp and compress the soil at regular intervals and to form openings in the tamped portions for the reception of young plants which it may be desired to set out.

For a full understanding of the invention and the merits thereof and also to acquire a knowledge of the details of construction and the means for effecting the result, reference is to be had to the following description and accompanying drawings, in which:

Figure 1 is a side elevation of the fertilizer distributer and seed dropper, portions being broken away and shown in sections, Fig. 2 is a transverse sectional view through the same, Fig. 3 is a perspective view of one-half of the casing which is applied to the distributer for housing the scatterer, Fig. 4 is a perspective view of the seed dropper, Fig. 5 is a detail view of the scatterer which is employed in connection with the casing shown in Fig. 3, Fig. 6 is a vertical sectional view through the same, Fig. 7 is a detail perspective view of the furrow closer, Fig. 8 is a perspective view of a portion of the disk which is employed for throwing the material broad cast, Fig. 9 is a sectional view through the rim of the furrow opening wheel, Fig. 10 is a plan view of the forward portion of the frame and a portion of the furrow opening wheel; and Fig. 11 is a detail perspective view of a portion of the rim of one of the main wheels.

Corresponding and like parts are referred to in the following description and indicated in all the views of the drawings by the same reference characters.

The main frame of the machine comprises a pair of spaced longitudinal bars 1 which are brought together at their forward ends and connected to a clevis 2, the rear ends of the bars being joined by a transverse bar. Journaled between the longitudinal bars 1 at the forward portion of the frame is a shaft or axle 4 having a furrow opening wheel 5 mounted thereon. Specifically describing this wheel 5 it will be observed that the outer portion of the rim thereof is sharpened or beveled as indicated at $5^a$ so as to open a furrow as the machine is advanced across a field, the inner side of the rim being rounded at $5^b$ so that the rim will not pick up dirt as the wheel revolves. It will also be observed that in the present instance the sharpened edge $5^a$ of the furrow opening wheel revolves close to the inwardly deflected forward ends of the longitudinal bars 1 which serve as scrapers to prevent clods of earth sticking to and accumulating upon the wheel.

A furrow closer 6 is mounted to travel behind the wheel 5 and this furrow closer is secured to a pair of beams 7 which project forwardly therefrom and have their extremities pivotally connected to the bars 1. It will thus be obvious that the furrow closer is free to swing vertically and that it will automatically accommodate itself to slight inequalities in the surface of the ground. As shown on the drawing this furrow closer has a substantially semi-circular shape, the curved edge facing downwardly and being formed with an approximately V-shaped groove 8 which is tapered from one end of the furrow closer to the opposite end. Bosses 9 project laterally from the upper portion of the furrow closer and loosely receive the inwardly extended ends $7^a$ of the beams 7, set screws 10 being threaded in the bosses for engagement with ends $7^a$ of the beams to hold the furrow closer securely in an adjusted position. This furrow closer as will be readily apparent may be set either with the broad or narrow end of the groove 8 facing the front of the machine and may be turned about the ends 7ª of the beams 7 and clamped in any desired position.

A second transverse shaft or axle 11 is journaled between the longitudinal bars 1 in rear of the before-mentioned shaft 4 and the ends of this second shaft project outwardly beyond the longitudinal bars 1 and have the drive wheels 12 applied thereto. The rims of these drive wheels 12 are preferably provided with the teeth 13 in order to prevent them from slipping as the machine is advanced, and each wheel is shown as provided with two rows of the teeth, the teeth of one row being arranged alternately with respect to the teeth of the opposite row. This feature of the device is important since as will be hereinafter set forth these drive wheels operate the distributing mechanism and where the wheels are prevented from slipping a uniform distribution of the fertilizer or other material is obtained.

A pair of arches 14 project upwardly from the longitudinal bars 1 to which they are secured, and clipped or otherwise suitably connected to these arches are the handle bars 15 which project rearwardly behind the frame in the usual manner and are substantially parallel to the bars 1. A hopper 16 designed to receive the fertilizer, paris green, plaster, or other material to be distributed is supported between the arches 14, the upper portion of the hopper being rectangular in horizontal section while the lower end 16ª is circular in horizontal section. A cross bar 17 extends across the upper end of the hopper and a vertical shaft 18 which extends through the hopper is journaled between this cross bar and a spider or yoke 19 which is located under the hopper, the ends of the spider being extended downwardly and secured to the bars 1. The lower end of this vertical shaft 18 is provided with a beveled pinion 20 meshing with a beveled gear wheel 21 upon the shaft 11.

The beveled pinion 20 is loose upon the shaft 18 and is provided with a clutch member 22, a complemental clutch member 23 being secured to the shaft 18 for coöperation with the clutch member 22 to cause the pinion 20 and shaft 18 to rotate in unison. The shaft 18 is also mounted to receive a vertical movement for the two fold purpose of throwing the shaft into and out of gear and regulating the discharge of the fertilizer or other material from the hopper. To effect this vertical adjustment of the shaft 18 a lifting mechanism is provided for coöperation therewith, the same consisting of complemental cams 24 and 25, the cam 24 being carried by the cross bar 17 while the cam 25 is formed at the lower end of a sleeve which is loose upon the shaft and has an operating lever 26 connected thereto. A set collar 27 is secured to the shaft 18 above the cam 25 and limits the upward movement of the same cam. As the cam 25 moves upward by riding upon the cam 24, it effects the lifting of the shaft 18 by coming into contact with the set collar 27. For the purpose of locking the operating lever 26 in an adjusted position a curved bar 28 is utilized, the said bar being connected at its ends to the hopper and being formed in its upper edge with a series of notches 29 into any selected one of which the operating lever may be fitted.

A disk 30 is rigidly applied to the vertical shaft 18 so as to be movable therewith and when this disk is moved upwardly it closes the discharge end of the hopper while when it is moved downwardly it permits the material within the hopper to feed to the distributer, the quantity being fed being determined by the distance between the lower edge of the hopper and the disk. When it is desired to restrict the distributing mechanism and cause it to discharge the material in a single stream upon each side of the hopper a transversely elongated casing 31 is fitted to the bottom thereof, the ends of the casing projecting laterally upon opposite sides of the machine and terminating in the vertical slits 31ª. This casing may be formed in complemental sections which are fitted together around the disk 30, and the ends of the casing are provided with the upwardly projecting hook members 32 which detachably engage the handle bars 15. The periphery of the disk 30 is formed with an annular groove 33 receiving the inner edges of a circular plate 34 which is applied thereto, the said plate being formed in two sections which are fitted to the disk from opposite sides thereof and detachably connected in any suitable manner as by means of the bolts and cross piece 35. This plate or disk carries the radial blades 36 which form in effect a fan and serves to discharge the material dropped into the casing through the vertical slits 31ª in the ends thereof. A series of air inlet openings 37 are formed in the top of the casing 31 around the hopper 16 and the effective size of the openings is controlled by a damper or cut off in the nature of a ring 38 which is loosely mounted upon the casing, the said ring being formed with openings 38 corresponding to the air inlet openings 37 and adapted to be moved either into partial or complete registry therewith. It will be obvious that when the vertical shaft 18 is lowered the disk 30 will be moved away from the discharge end of the hopper to admit of the material therein being dropped into the casing and the clutch member 23 will at the same time be moved into engagement with the clutch member 22 so that the plate 34 will be rotated and the material fed into the casing and discharged through the slits 31ª. This device is particularly designed for the distributing of paris green, although it may with equal facility be utilized for the distribution of fertilizer, plaster, or any similar material.

Should it be desired to scatter the material broad cast the casing 31 is removed and a plate 39 substituted for the plate 34, the said plate 39 being also formed in sections which are fitted to the disk 30 from opposite sides thereof and suitably connected. This plate 39 is however considerably larger than the plate 34 and is formed upon its upper face with the substantially radial wings 40. As this plate is revolved the material dropped thereon from the hopper is thrown outwardly by centrifugal force and scattered broad cast. When it is desired to stop the distributer it is merely necessary to manipulate the lever 26 and lift the shaft 18 until the disk 30 closes the lower end of the hopper, the clutch 23 being thereby moved out of engagement with the clutch 22 so that the beveled pinion 20 can rotate independently of the shaft.

When the machine is employed as a planter a seed dropping mechanism is applied to the front of the hopper 16. This seed dropping mechanism comprises a seed hopper 41 having sprocket wheels 42 journaled in the top and bottom thereof, the upper sprocket wheel having a chain and sprocket connection 43 with the shaft 4 of the furrow opening wheel. Passing around these two sprocket wheels 42 is an endless belt 44 provided with the coöperating seed gripping jaws 45 similar to those disclosed in my previous patent No. 883,563, issued March 31, 1908. As these jaws pass around the upper sprocket wheel 42 they automatically release the seed and drop it into a tube 46 which terminates immediately in rear of the furrow opening wheel 5. It will thus be obvious that as the machine moves forwardly the sprockets 42 will receive motion from the shaft 4 and as the endless belt 44 moves the jaws 45 thereof will elevate the seeds from the bottom of the hopper and discharge them into the tube 46 from which they will drop into the furrow.

It is also within the province of the invention to employ an indicator attachment for compacting the soil at intervals after it has been acted upon by the furrow closer, openings being formed in the compacted portions of the earth for any young plants it may be desired to set out. This indicator attachment comprises a vertical rod 47 which is mounted to have a reciprocating movement, the lower end of the rod being provided with a plate 48 and terminating in a finger 49 which projects downwardly below the plate. The upper end of the rod 47 is provided with a projection 50 adapted to be engaged by a radial arm 51 projecting from a horizontal shaft 52 having a chain and sprocket connection 53 with the drive shaft 11. A spring 54 is connected to the rod 47 and normally holds the same yieldingly in a lowered position with the projection 50 in the path of the radial arm 51. As the shaft 52 rotates this radial arm 51 will engage the projection 50 and lift the rod against the action of the spring 54 and as soon as the radial arm slips from under the projection the rod will be moved downwardly by the spring, the plate 48 engaging the earth to compact the same and the finger 49 serving to form an opening in the compacted portion thereof. In this manner the earth is compacted and openings formed at regular intervals, the frequency of the intervals depending upon the gearing between the horizontal shaft 52 and the drive shaft 11 and also upon the length of the radial arm 51.

When using the device as a fertilizer distributer it may be found desirable to mount a screen 55 upon the shaft 18, the said screen being arranged within the hopper above the discharge opening in the bottom thereof and serving to prevent any large lumps from reaching the discharge opening.

Having thus described the invention, what is claimed as new is:

1. In an implement of the character set forth, the combination of a hopper having a discharge opening, a distributer for scattering the material fed through the discharge opening, and an elongated casing formed in complemental sections which are applied to the distributer from opposite sides thereof, the ends of the casing being provided with slots for directing the material received from the distributer in predetermined directions.

2. In an implement of the character set forth, the combination of a supporting frame, a hopper mounted upon the supporting frame and having a discharge opening, a distributer for scattering the material fed through the discharge opening, a casing inclosing the distributer and formed with openings for directing the material received from the distributer in predetermined directions, and hook members upon the casing for detachably engaging the frame to hold the casing in position.

3. In an implement of the character set forth, the combination of a supporting frame, a hopper mounted upon the supporting frame and formed with a discharge opening, a distributer for scattering the material fed through the discharge opening, an elongated casing formed in complemental sections which are applied to the distributer from opposite sides thereof, the said casing being provided with openings for directing the material received from the distributer in predetermined directions and hook members upon the casing for detachably engaging the frame to hold the casing in position.

4. In an implement of the character set forth, the combination of a hopper formed with a discharge opening, a casing applied to the discharge opening of the hopper and formed with slots, and a fan operating within the casing for scattering the material fed into the casing through the slots, the said casing being formed with air inlet openings for the fan.

5. In an implement of the character set forth, the combination of a hopper formed with a discharge opening, a shaft passing through the discharge opening, a disk applied to the shaft and having a groove in the periphery thereof, means for rotating the shaft, means for moving the shaft vertically to cause the disk to open and close the discharge opening of the hopper, and a sectional plate fitted to the groove of the disk and provided with distributing means.

6. In an implement of the character set forth, the combination of a hopper formed with a discharge opening, a shaft passing through the discharge opening, a distributer applied to the shaft, a screen applied to the shaft and located within the hopper for breaking up the material therein before it is fed to the distributer and means for rotating the shaft.

In testimony whereof I affix my signature in presence of two witnesses.

WASHINGTON B. PARRISH. [L. S.]

Witnesses:
D. T. KENNEDY,
GEO. W. WATCHALL.